June 2, 1931.  B. READ  1,807,635
SPRING SHACKLE
Filed March 21, 1929  2 Sheets-Sheet 2

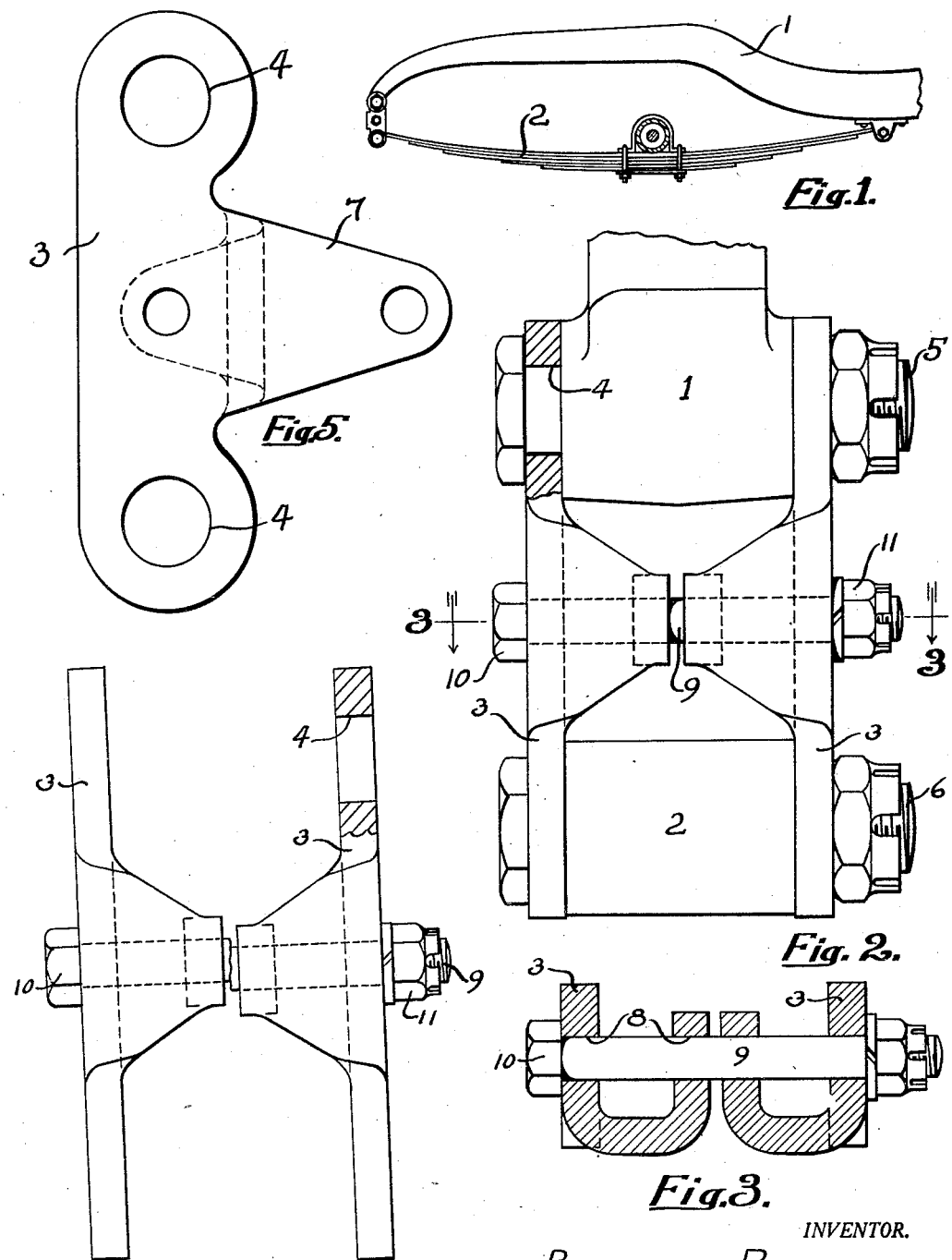

INVENTOR.
BALFOUR READ.
BY
Harness, Dickey & Pierce
ATTORNEY.

Patented June 2, 1931

1,807,635

UNITED STATES PATENT OFFICE

BALFOUR READ, OF DETROIT, MICHIGAN, ASSIGNOR TO EATON SPRING CORPORATION, A CORPORATION OF OHIO

SPRING SHACKLE

Application filed March 21, 1929. Serial No. 348,840.

This invention relates to shackles such as are conventionally employed in connection with the spring suspension of motor vehicles.

An object of the invention is to so connect the two links of a spring shackle as to resist any tendency of the links to tilt laterally relative to the shackle bolts, whereby to eliminate the resulting undue wear and eventual looseness and rattling which arises in conventional constructions from this cause.

Another object is to establish a connection between the links of a spring shackle, supplementary to that formed by the usual shackle bolts for resisting the tendency of said links to tilt or cant relative to said bolts, responsive to laterally acting stresses.

A further object is to so stamp and fashion the links of a vehicle spring shackle from sheet metal as to adapt them to be securely held from lateral tilting by a supplementary member connecting the links and resisting such tilting by a shearing stress set up in it.

These and various other objects the invention attains by the construction hereinafter described and illustrated in the accompanying drawings, wherein:

Fig. 1 is a view in side elevation of an end portion of a vehicle frame and one of its supporting springs, showing the latter shackled to the frame in accordance with this invention.

Fig. 2 is a rear (or front) elevation view of the improved shackle.

Fig. 3 is a cross sectional view of the shackle, taken upon the line 3—3 of Fig. 2.

Fig. 4 is a rear (or front) view partially in section, of the shackle links showing how the bolt which forms a supplementary connection between said links tends to respond in shear to tilting of said links relative to said bolt.

Fig. 5 is a side view of one of the link forming blanks showing its original form in full lines, and its final form in dash lines.

Figure 9:
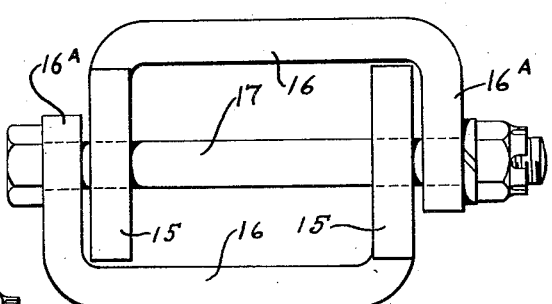
Fig. 9 is a bottom view of the same.

In these views, the reference character 1 designates a vehicle frame side member, and 2 a supporting spring for said member, which as illustrated is of the so-called semi-elliptic form. It is to be understood, however, that the invention is also applicable to other types of vehicle springs.

My improved shackle, which is illustrated as connecting one end of the spring 2 to the frame side member 1, comprises a pair of duplicate links 3, stamped from sheet metal and having in their end portions the usual openings 4 to receive the usual shackle bolts 5 and 6 connecting said links to each other and to the frame side member 1 and spring 2. The shackle, as so far described, conforms to standard practice, except that it is usual to use forgings for the links for the reason that sheet metal, even of the heaviest gauge available, has not afforded sufficiently extensive bearings for the shackle bolts to adequately resist a tendency of the links to tilt or cant, relative to said bolts, with resultant heavy wear on the bolt-engaging portions of the links and eventual looseness and rattle. The present invention provides a connection between the links of a shackle, supplementary to that established by the usual bolts, which connection, through eliminating side sway of the links relative to the bolts, permits formation of the links as sheet metal stampings and achieves a desirable economy as compared to present forged constructions.

Thus in Figures 2 to 5 inclusive, there is shown a shackle comprising a pair of stamped sheet metal links 3 having openings 4 in their ends for engagement by the usual bolts 5 and 6 for connecting said links to the frame side member 1 and spring 2 respectively. These links are preferably formed from sheet metal of relatively heavy gauge. The mid-portions of said links are formed with triangular tongues 7, projecting from corresponding edges of the links transversely to the length thereof. These tongues are bent correspondingly, as best seen in Figure 3, so that their end portions extend in a parallel spaced relation to the mid-portions of the links, and aligned openings 8 are formed in said tongues and at the link centers to receive a bolt 9 centrally connecting said links. The bolt 9 is headed at 10 against the outer face of one of the links and is threaded at its other end for engagement by a nut 11, which may be clamped tightly against the outer face of the other link, or may be provided solely for the purpose of preventing displacement of the bolt 9 as is assumed in the present case. In any case, in the construction shown, the bolt 9 does not prevent tightening of the nuts on the shackle bolts 5 and 6 to take up any wear that may develop between the sides of the links and the adjacent faces of the frame side member or the spring. The tongues 7 are sufficiently spaced apart to prevent direct contact between the links, the preferred relation being such that the bolt 9 is subjected to shear only between the tongues 7 in resisting relative lateral movement between the frame and the spring.

Because of the considerable spaced relation between the two bearings for the bolt 9 formed respectively by the body and by the tongue 7 of each link, a powerful resistance is offered by the bolt 9 to any lateral tilting of the links relative to said bolt, and consequently the links are restrained also from any such tilting relative to the bolts 5 and 6. It follows that the bearings formed for the bolts 5 and 6 in said links will not be subjected to appreciable wear despite the relatively small axial extent of said bearings since in conventional constructions the primary cause of wear at the bolts 5 and 6 is lateral tilting of the links with respect to the bolts and not the normal pivotal play of the links forward and back upon the bolts, and in the case of the bolt 9, wear from this last cause is lacking.

Figure 6:
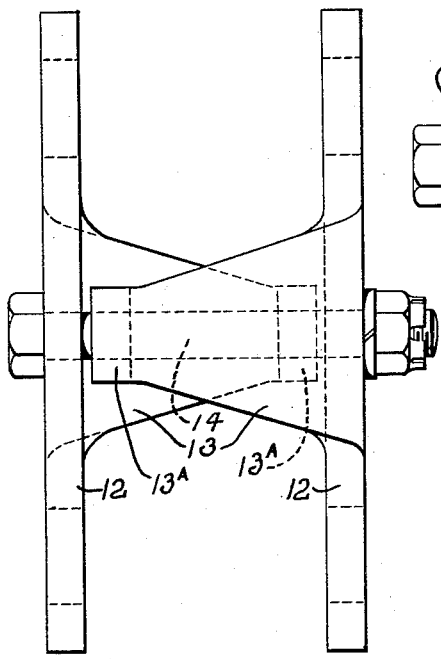
Fig. 6 is a view in rear (or front) elevation of a pair of modified shackle links, connected in accordance with this invention.
Figure 7:
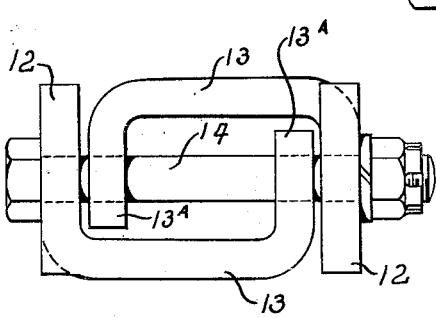
Fig. 7 is a bottom view of the same.

In that form of the invention illustrated by Figures 6 and 7, the shackle links 12 are of stamped sheet metal and formed with tongues 13 integrally projecting from their mid-portions as in the first described construction, but in this modification said tongues are relatively long so that the end portion 13a of the tongue of each link lies in the assembled shackle, closely adjacent to the inner face of the other link, the two tongues thus overlapping each other in a spaced relation as best appears in Fig. 7. Thus the two bearings formed by each link, one in the body and the other in the tongue thereof to receive a bolt 14 connecting the mid-portions of the shackles, are spaced considerably greater distances apart than in the first described construction, and consequently offer a greater resistance to lateral tilting of the links relative to said bolt and to the usual shackle bolts, than the first described construction. The end 13a of the tongue 13 of each link 12, in this case, preferably lies in close but spaced relationship in respect to the opposite link 12, the tilting of the links 12 thus being resisted by shear in the bolt 14 at two separate points instead of one as in the previous case.

Figure 8:
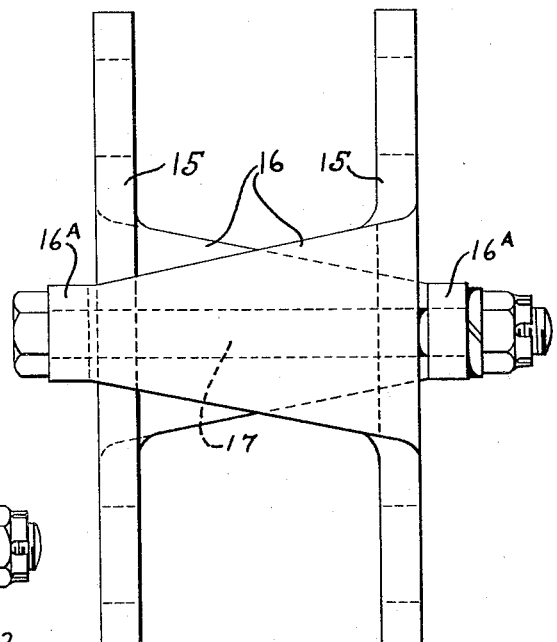
Fig. 8 is a rear (or front) view of a pair of shackle links and a connection between the same, constituting a further modification of the invention.

In the further modification shown in Figures 8 and 9, the mid-portions of the two links 15 are formed with still longer central tapered tongues 16, whereby upon suitably bending such tongues, the end portions 16a thereof are adapted to extend close adjacent to the outer faces of the links, as best appears in Fig. 9, so that the bolt 17 engaging said tongues and the mid-portions of the said links offer a resistance to tilting of the links relative to the bolt 17 and usual shackle bolts still greater than the constructions heretofore described.

While it is preferred in the interest of economy to form the links of the described shackle as sheet metal stampings, it is to be understood that said links may be forged or otherwise formed as desired. The primary feature of the invention is the establishment of a connection between a pair of shackle links supplementary to that formed by the usual bolts, restraining the links from any such lateral angular movement relative to the bolts as would subject the bolts or the bearing portions of the links to undue wear or strains.

The above described constructions are as equally efficient and satisfactory, if not more so, than the forged type of link provided with an elongated boss for reception of the shackle bolts whereby to better resist the tilting of the links referred to, and it is obvious that they are considerably more economical to produce. They are found to be particularly valuable in connection with various types of rubber insulated shackle constructions now being offered to the public.

Formal changes may be made in the specific embodiment of the invention described without departing from the spirit or substance of the broad invention, the scope of which is commensurate with the appended claims.

What I claim is:

1. A spring shackle, comprising a pair of spaced links having their mid-portions formed with a pair of tongues, each integral with one of said links, bent to terminally form bearings spaced from the links, and a bolt connecting the links and engaging said bearings.

2. A spring shackle, comprising a pair of spaced links having their mid-portions formed with a pair of tongues, each integral with one of said links, bent to terminally form bearings spaced from the links, and a bolt connecting the links and engaging said bearings and offering a shearing resistance to lateral tilting of the links relative to said bolt.

3. A spring shackle comprising a pair of companion links having their mid-portions formed with a pair of tongues, each integral with one of said links, projecting toward each other and terminally bent to form bearings spaced from the links, and a member connecting the links and engaging said bearings and offering a shearing resistance to lateral tilting of the links relative to said bolt.

4. A spring shackle, comprising a pair of companion links having their mid-portions formed with a pair of tongues bent toward each other and terminally bent to form a pair of bearings between and spaced from said links, and a bolt connecting said links and engaging said bearings and offering a shearing resistance to lateral tilting of the links relative to said bolt.

5. A spring shackle comprising a pair of companion links, a bolt connecting the mid-portions of said links, and means rigidly carried by each link and engaging said bolt remote from said link, setting up a shearing stress in said bolt in response to forces tending to laterally tilt the links relative to the bolt.

6. A spring shackle comprising a pair of companion links having the nature of sheet metal stampings and having their mid-portions integrally formed with a pair of tongues bent toward each other and terminally bent to form bearings spaced from said links, said tongues being tapered from the links to said end portions, and a bolt connecting the links and engaging said bearings and offering a shearing resistance to lateral tilting of the links relative to said bolts.

7. In a spring shackle, in combination, a pair of sheet metal links, each of said links having a bent tongue portion extending towards and terminating in spaced but adjacent relationship with respect to a surface of the other of said links, and a single member extending through both of said links and both of said tongues.

8. A spring shackle link having its mid-portion formed with an opening and integrally formed with a tongue terminally bent to a spaced relation with said link and formed with an opening aligned with the first mentioned opening.

9. A spring shackle link formed of sheet metal and providing a main body portion for reception of the usual shackle bolts, said main body portion being provided with an opening between its ends, and a laterally off-set portion provided with an opening, aligned with the first mentioned opening and spaced therefrom.

10. A spring shackle link comprising, in combination, a main body portion, a tongue rigidly fixed thereto centrally located relative to one central line of said body portion and offset relative to another central line of said body portion, and a terminal portion rigidly fixed to said tongue and projecting therefrom in spaced relation to said body portion, said body portion and said terminal portion being provided with aligned openings therein.

11. A spring shackle link formed of sheet metal and bent into a U-shape, oppositely extending portions rigidly fixed to one of the sides of said U and provided at their ends with spring bolt receiving openings, and each side of said U being provided with an opening aligning with the corresponding opening in the other side.

12. A spring shackle comprising a pair of links and a central shear member, each of said links comprising a member U-shaped in transverse section, each side of said U being provided with an opening therein, the said openings in each of said links being aligned, and said shear member extending through and fitting all of said openings.

BALFOUR READ.